(12) United States Patent
Yang

(10) Patent No.: US 10,826,030 B2
(45) Date of Patent: Nov. 3, 2020

(54) PACKAGE STRUCTURE OF ELECTRONIC MODULES WITH SILICONE SEALING FRAME AND THE MANUFACTURING METHOD THEREOF

(71) Applicant: Prologium Holding Inc., Grand Cayman (KY)

(72) Inventor: Szu-Nan Yang, Taipei (TW)

(73) Assignee: PROLOGIUM HOLDING INC., Grand Cayman (KY)

(*) Notice: Subject to any disclaimer, the term of this patent is extended or adjusted under 35 U.S.C. 154(b) by 630 days.

(21) Appl. No.: 15/141,826

(22) Filed: Apr. 29, 2016

(65) Prior Publication Data

US 2016/0249474 A1 Aug. 25, 2016

Related U.S. Application Data

(63) Continuation-in-part of application No. 13/714,373, filed on Dec. 13, 2012, now abandoned.

(51) Int. Cl.
*H01M 2/08* (2006.01)
*H01G 9/20* (2006.01)
*H01L 51/52* (2006.01)
*G02F 1/1339* (2006.01)

(52) U.S. Cl.
CPC ............ *H01M 2/08* (2013.01); *G02F 1/1339* (2013.01); *H01G 9/2077* (2013.01); *H01L 51/5246* (2013.01); *Y02E 10/542* (2013.01)

(58) Field of Classification Search
None
See application file for complete search history.

(56) References Cited

U.S. PATENT DOCUMENTS

| 5,239,034 A * | 8/1993 | Takago ............... C08L 83/14 525/478 |
| 2006/0216586 A1* | 9/2006 | Tucholski ............. H01M 2/021 429/162 |

FOREIGN PATENT DOCUMENTS

| JP | 09-283387 | * 10/1997 | ............ H01G 9/155 |
| JP | 2001-040094 | * 2/2001 | ........... C08G 77/382 |
| JP | 2009-245782 | * 10/2009 | ............ H01M 14/00 |
| JP | 2009-289549 | * 12/2009 | ............ H01L 31/04 |

* cited by examiner

*Primary Examiner* — Ula C Ruddock
*Assistant Examiner* — Tony S Chuo

(57) ABSTRACT

A package structure of electronic modules includes two substrates and a sealing frame. The sealing frame comprises two first silicone frames, a second silicone frame and two crystalline interfaces. The sealing frame is disposed between and within the two substrates to form a space thereof. The sealing frame serves as an excellent moisture barrier of the package structure due to the intrinsic properties of silicone. Meanwhile, the silicone can withstand the corrosion of the polar solvents and/or the plasticizers. A manufacturing method of the package structure is disclosed in this invention as well.

20 Claims, 5 Drawing Sheets

PACKAGE STRUCTURE OF ELECTRONIC MODULES WITH SILICONE SEALING FRAME AND THE MANUFACTURING METHOD THEREOF

RELATED-APPLICATIONS

This application is a continuation-in-part of U.S. patent application Ser. No. 13/714,373, filed Dec. 13, 2012. This application claims priority to all the above-referenced applications.

BACKGROUND OF THE INVENTION

Field of Invention

The present invention relates to a package structure, in particular to a package structure using a silicone frame as a sealing frame of the electronic module.

Related Art

Electronic modules, such as liquid crystal display (LCD) module, dye-sensitized solar cell (DSSC) module, organic light-emitting diode (OLED) module, plasma display module, or thin battery cells module, include a pair of parallel electrode plates. The main body is disposed therebetween and packaged by a package sealed by a sealing frame. Therefore, the air, dirt, moisture, and other contamination could be blocked.

Generally speaking, there are two main kinds of materials for the sealing frame. The first one is the material with high polarity, such as epoxy resin, acrylic resin, UV glue, or Polyurethane (PU). It can be mixed with a solvent for dilution and coated or printed on the substrate. Then a cross-linking reaction is performed for polymerization by heating or exposure to ultraviolet, visible or near infrared irradiation. The second kind is the material, such as Polypropylene (PP), Polyethylene (PE), or thermoplastic polymer. These materials have good fluidity in high temperature which is suitable for coating. And the hot-pressing process is performed for adhesion and generating partial crystalline region to block air, dirt and moisture.

For the first kind material, the material with high polarity, such as epoxy resin, acrylic resin, UV glue, or Polyurethane (PU), has good adhesion with almost all materials of the substrate, such as polyimide (PI), polyethylene terephthalate (PET), polyethylene naphthalate (PEN), metal, glass, glass fiber, and liquid crystal polymer, ceramic. The materials with high polarity have polar functional groups. The organic solvent or plasticizer contained within the electronic modules is easy to penetrate into the sealing frame. The adhesion and the sealing ability between the sealing frame and the substrates will be reduced. Especially, for the dye-sensitized solar cell (DSSC) module and the colloidal or liquid energy storage battery, the condition is worse.

For the second kind material, this material is non-polar and is suitable to utilize in the dye-sensitized solar cell (DSSC) module and the colloidal or liquid energy storage battery. However, the poor fluidity would bring about a great deal of trouble in pattern coating by printing. Also, the adhesion with the material of the substrate, such as metal or other materials with high polarity, is not good enough for sealing the pair of parallel electrode plates, such as LCD or OLED.

Similar to the second kind material (ex. PP or PE), the silicone material is also difficult to adhere to the material having different properties such as metal, glass, or polymer. The pure silicone material does not have enough strong dispersive adhesion with most of materials of the substrate.

As known, the silicone material will perform both the condensation reaction and the addition reaction during curing. However, the silicone structure cured by a condensation reaction has poorer adhesion ability than an addition reaction does. Also because the byproduct of the condensation reaction is hydrogen, bubbles would be greatly generated during curing and the adhesion ability of the silicone material would become quite poor. As refer to FIG. 1, if the silicone frame 32 has more condensation ingredients, when the silicone frame 32 is disposed on the substrate 31 with different material, the gas would be greatly generated and moves randomly during curing. Once the gas generated is blocked by the substrate 31, the gas is gathered to form bubbles 33 at the interface therebetween. Because the polarity of the silicone material is very low, it would has repulsive force to the moisture/water. In such package structure, the moisture only can only penetrate into the silicone structure by slow diffusion along the interface with poor morphology. Meanwhile, the bubbles 33 at the interface would reduce the adhesion ability of the silicone frame 32 and would shorten the diffusion path for the moisture. Eventually, the silicone frame 32 would be easily peeled off.

General speaking, the silicone material is used for covering or filling. In other words, one side of the silicone frame 32 is free during/after curing, as shown in FIG. 1, instead of sandwiched by two solid materials (ex. compact substrates). If the curing is performed slowly, the generated gas can be exhausted slowly and freely. However, if the silicone frame is placed between two compact materials (not shown), apparently, most of the gas generated during curing would be blocked by the substrates sandwiching the silicone frame. As more and more gas is generated, the gas generated would gather to form bubbles, which damage the adhesion interfaces between the silicone frame and the substrates.

Accordingly, there is a need for new package structure/material to overcome the above problems.

SUMMARY OF THE INVENTION

It is an objective of this invention to provide a package structure. The sealing frame serves as an excellent moisture barrier. Meanwhile, the silicone is a good resistant of corrosion and chemicals. Also, the corrosion of polar solvent and plasticizer is withstood due to the intrinsic properties of the silicone.

Another objective of this invention is to provide a package structure. At least one auxiliary sealing frame is disposed on the outside of the second silicone frame to greatly decrease the amount of the moisture penetration.

Another objective of this invention is to provide a manufacturing method for the package structure. Adhere the first silicone frames to the substrates via curing the first silicone frames to form chemical cross-links with the substrates. Adhere the two cured first silicone frames via curing the second silicone frame so that the two substrates adhering to the first silicone frames are assembled together.

This invention discloses a package structure. The package structure includes two substrates and a sealing frame. The sealing frame is deposited between and within the substrates orthographically and seals the substrates along their inner circumferences to form a space. The sealing frame includes two first silicone frames, a second silicone frame and two crystalline interfaces, wherein the first silicone frames perform good adhesion ability to the substrates via highly cross-linking bonds and the second silicone frame performs good adhesion ability to the first silicone frames via highly crystallization. Accordingly, the sealing frame can serve as an excellent moisture barrier. Also, the corrosion of polar solvent and plasticizer can be withstood due to the intrinsic propertied of the silicone.

Furthermore, to enhance the adhesion between the first silicone frames and the two substrates, the first silicone frame is modified the interfacial tension and the polarity thereof to enhance the adhesion for different materials. The first silicone frames are modified by increasing a proportion of addition-type silicone.

A manufacturing method of the package structure is also disclosed. The method comprising: a) providing two substrates; b) applying two first silicone frames respectively along two inner circumferences of the substrates and at least partially curing the first silicone frames; c) applying a second silicone frame orthographically corresponding to at least one of the first silicone frames; and d) assembling the substrates together via adhering the second silicone frame and the first silicone frames via curing the second silicone frame.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
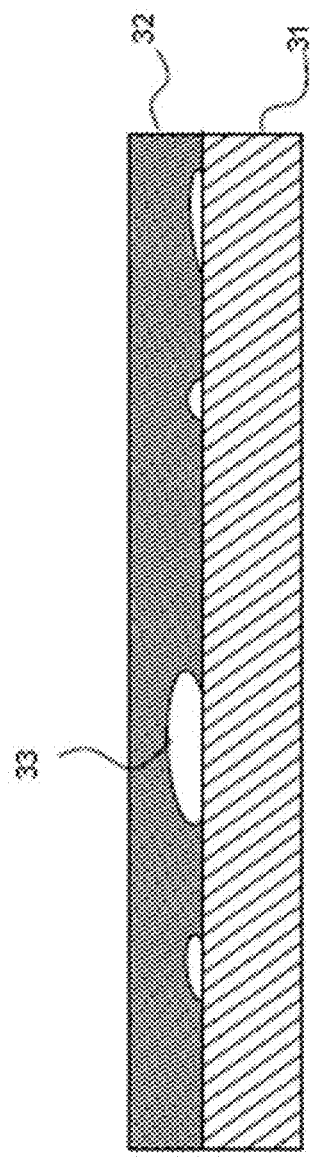
FIG. 1 illustrates the example of the conventional coating silicone frame.
Figure 2A:
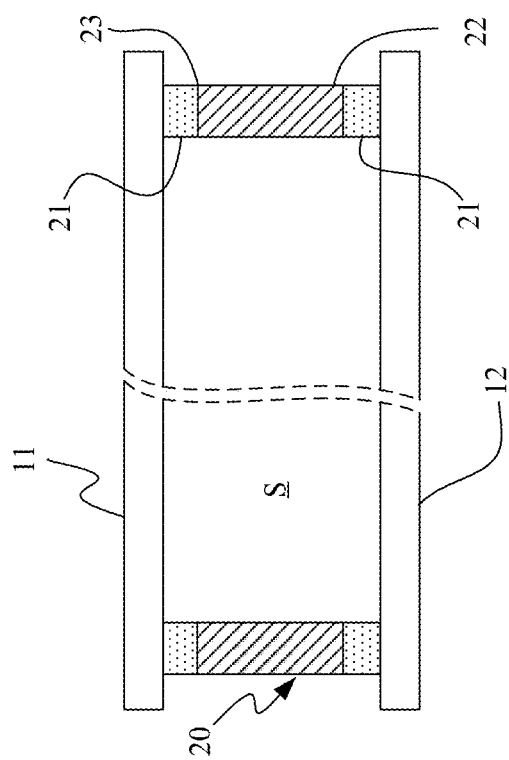
FIGS. 2A and 2B respectively illustrate the package structure and the manufacturing method according to the present invention.

Please refer to FIG. 2A, the package structure includes two substrates 11 and a sealing frame 21. The sealing frame includes two first silicone frames 21, a second silicone frame 22 and two crystalline interfaces 23.

The substrates 11 may be the electrode plates of the electronic modules, such as liquid crystal display (LCD) module, dye-sensitized solar cell (DSSC) module, organic light-emitting diode (OLED) module, plasma display module, or thin battery cells module. Therefore, the materials of the substrates 11 can be selected from the group consisting of polyimide (PI), polyethylene terephthalate (PET), polyethylene naphthalate (PEN), metal, glass, glass fiber, or liquid crystal polymer.

The sealing frame 20 is disposed between and within the two substrates 11 orthographically. The sealing frame 20 seals the substrates 11 along their inner circumferences to form a space S for placing an electronic module (not shown). Each of the first silicone frames 21 respectively adheres to the substrates 11 along the inner circumferences and the first silicone frames 21 mainly contains a chemical formula I of:

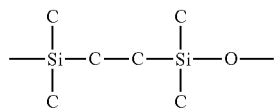

The second silicone frame 22 is deposited at least partially overlapping on the first silicone frames 21 orthographically. The second silicone frame 22 is sandwiched via the first silicone frames 21. The second silicone frame 22 mainly contains a chemical formula II of:

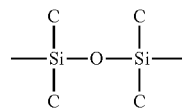

The two crystalline interfaces 23 are deposited between the first silicone frames 21 and the second silicone frame 22. Hence, firstly the first silicone frames 21 are at least partially cured (or completely cured) to adhere to the substrates 11 and then the second silicone frame 22 is cured with the first silicone frames 21 to adhere the substrates 11 together.

The first silicone frames 21 are modified the interfacial tension and the polarity thereof depending on the materials of the substrates 11. Therefore, the good adhesion situations are presented on the interfaces between the first silicone frames 21 and the substrates 11. The first silicone frames 21 are modified by adjusting a proportion of condensation-type silicone and addition-type silicone and/or by adding Epoxy, Acrylic Acid or a combination thereof.

Figure 2B:
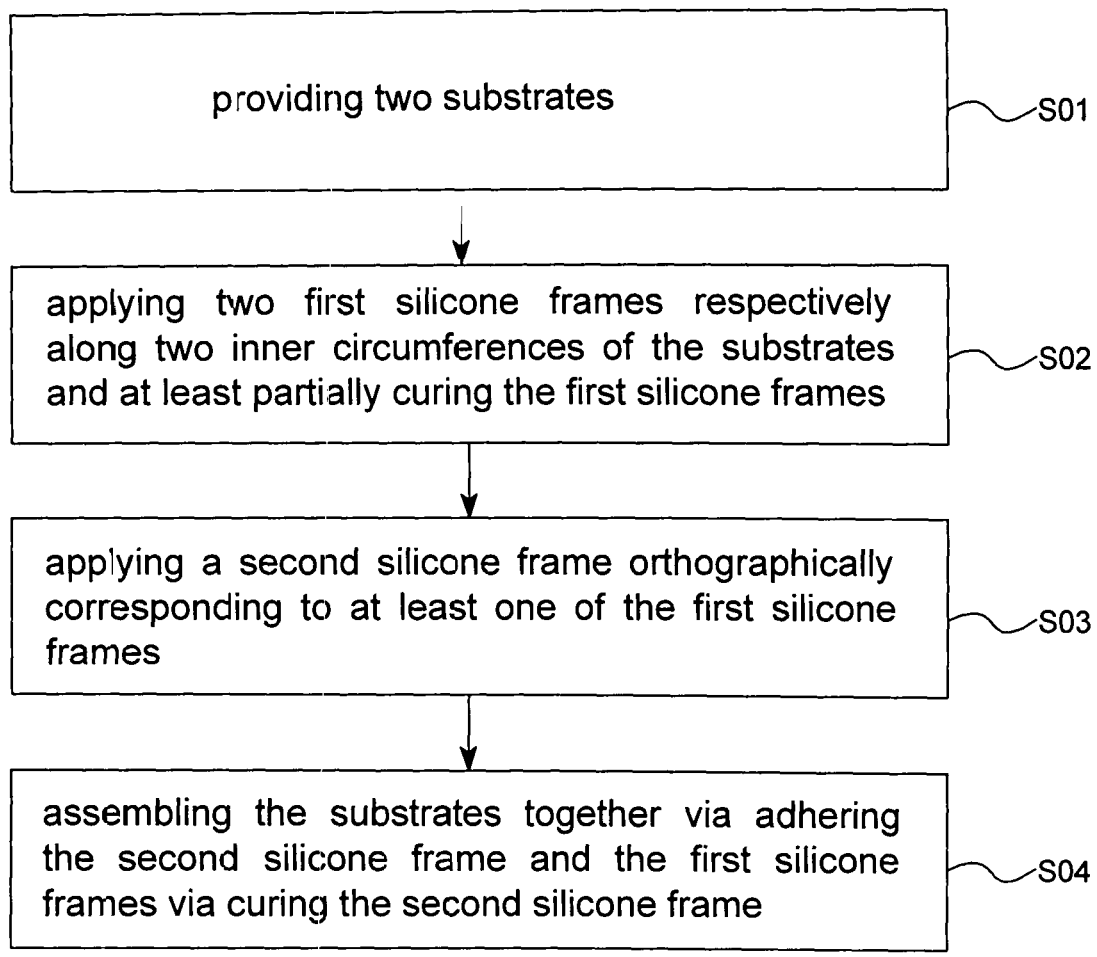

According to the package structure disclosed above, a manufacturing method for a package structure is illustrated in FIG. 2B and comprises the following steps. Firstly, as illustrated in S01, providing two substrates 11; then S02 is to apply two first silicone frames 21 respectively along two inner circumferences of the substrates 11 and at least partially curing the first silicone frames 21; in S03, applying a second silicone frame 22 orthographically corresponding to at least one of the first silicone frames 21; and finally, in S04, assembling the substrates 11 together via adhering the second silicone frame 22 and the first silicone frames 21 via curing the second silicone frame 22. During curing the second silicone frame 22, two crystalline interfaces 23 between each of the first silicone frames 21 and the second silicone frame 22 are formed at the same time due to the crystallization occurred in the contacting surfaces of the first silicone frames 21 and the second silicone frame 22.

Based on the above, the methods of applying the first silicone frames 21 and/or the second silicone frame 22 are operated via coating and/or printing. That is, the first silicone frames 21 can be coated and/or printed on the substrates 11; the second silicone frame 22 can be coated and/or printed directly on the first silicone frames 21. The second silicone frame 22 at least partially (or completely) overlapping at least one of the first silicone frames 21 orthographically.

As for the curing method for the first silicone frames 21 and the second silicone frame 22, the elevated temperature may be exerted for curing the first silicone frames 21 and the second silicone frame 22. However, the curing procedure should be operated via slow polymerization for the first silicone frames 21; the curing procedure should be operated via rapid polymerization for the second silicone frame 22. Besides, the first silicone frames 21 are suggested to be cured with a free side of the first silicone frames 21; the second silicone frame 22 is suggested to be cured via pressing properly.

After the first silicone frames 21 are cured, the first silicone frames 21 are chemically cross-linked with the surfaces of the substrates 11 mainly via —Si—C—C—Si—O-chain of the formula I. Comparing to the —Si—O—Si-chain of the formula II, the —Si—C—C—Si—O-chain can generated stronger bonding forces with the non-silicone-based material, such as the substrates 11. Furthermore, due to one free side, the gas generated during curing the first silicone frames 21 can be exhausted easily and quickly. Also, the first silicone frames 21 are modified depending on the materials of the substrates 11 so that the adhesion ability can be adjusted according to how to modify the first silicone frames 21. Unlike the —Si—C—C—Si—O-chain of the formula I, the —Si—O—Si-chain of the formula II is softened and can form high crystalline structure via aligning the —Si—O—Si-chain after curing, especially after curing under hot-pressing. Because the cured first silicone frames 21 are cross-linked, it is difficult to be cured with the un-cured second silicone frame 22. Since then, the elevated temperature and the pressure are much desirable for curing the second silicone frame 22 to form the better crystalline interfaces 23 between the first silicone frames 21 and the second silicone frame 22 to form a three-dimensional barrier with the cross-linking structure of the first silicone frames 21. In fact, the first silicone frames 21 also contain silicone with the chemical structure of the chemical formula II.

In order to generate the better crystalline interfaces 23, the amount of the silicone with the chemical formula II within the second silicone frame 22 is great than the amount of the silicone with the chemical formula II within the first silicone frames 21 by 0.1% to 60%, on a weight/volume basis. Accordingly, the amount of the carbon atoms of the first silicone frames 21 is great than the amount of the carbon atoms of the second silicone frame 22 by about 0.01 to 60 mole percent. On the other hand, the amount of the oxygen atoms of the first silicone frames 21 is less than the amount of the oxygen atoms of the second silicone frame 22 by about 0.01 to 60 mole percent.

According to what has mentioned above, it is obvious to know that due to higher oxygen-atom content of the second silicone frame 22, the stronger O-bonds can be formed for the crystalline structure after curing so that the highly crystallized interfaces 23 between the second silicone frame 22 and the first silicone frames 21 have good performances of blocking the moisture from the environment. Besides, the first silicone frames 21 are cured slowly under higher temperature, so only the lower oxygen-atom content of the silicone material may be more suitable for slow-curing process. Meanwhile, the carbon-atom content (ex. mainly contributed by —Si—C—C—Si—O—) of the first silicone frames 21 is higher than that of the second silicone frame 22 so that the first silicone frames 21 are easier to be adhered to the substrates 11 with different materials. For the second silicone frame 22, the higher the oxygen-atom content of the second silicone frame 22 is; the shorter the curing duration of the second silicone frame 22 requires.

Moreover, the first silicone frames 21 have higher content percentage of —Si—C—C—Si—O— silicone, which contain more carbon atoms, so that only few gas (ex. H2 and H2O) would be generated during curing. Based on this property, the electrical isolation ability of the —Si—C—C—Si—O— silicone would not be affected by the H2 and H2O generated after curing process. Meanwhile, the heat resistance of the first silicone frames 21 are quite well for containing more —Si—C—C—Si—O— silicone material. Accordingly, the second silicone frame 22 may laminate to the first silicone frames 21 by hot-pressing process because the cured first silicone frames 21 can bear for higher operation temperature without damages for the properties and the structure. However, the electrical isolation ability of the —Si—O—Si— silicone would be affected only in the beginning of curing and the ability would be recovered as the curing process completes, that is, the electrical isolation ability of the silicone layer itself can be constant after the whole curing process completes.

In some prior arts, the gas generated during curing the silicone material is moved randomly and blocked by the substrates which sandwich the silicone frame. The gas gradually aggregates into a big bubble which would destroy the adhesion interface between the silicone frame and the substrates. Also, the bubbles will be merged to a larger one to make the adhesion weaker. To form a structure with better moisture barrier, it has to accelerate the speed of forming the adhesion mechanism. However, the gas will be produced accordingly. Furthermore, the condensation reaction and the addition reaction will be performed at the same time. It is almost impossible to perform only one of the condensation reaction and the addition reaction.

Fortunately, in this invention, since the second silicone frame 22 has the same or substantially the same material with the first silicon frames 21, the adhesion force therebetween should be high. Hence, after curing the second silicone frame 22, the crystalline interfaces 23 between the first silicone frames 21 and the second silicone frame 22 are highly crystallized and the adhesion force is quite good. Comparing to the gas generated during curing the first silicone frames 21, the gas generated during curing the second silicone frame 22 is not so easy to be exhausted because the two sides of the second silicone frame 22 are blocked via the two adjacent first silicone frames 21. However, fortunately, the silicone material is not as compact as the substrates 11, in micro-view, the silicone has some holes inside and the property of the silicone is much softer, the gas generated still can be exhausted mostly even under some pressure. Also, because the intermolecular forces between the first silicone frames 21 and the silicone frame 22 are almost equal, the flow-rate of the gas inside of these two kinds of the silicone frames 21 and 22 are uniform. Thus, the gas will not easy to accumulate and further to merge into a big bubble. Therefore, the good adhesion can be achieved on the crystalline interfaces 23 between the first silicone frames 21 and the second silicone frame 22 so that the moisture is difficult to permeate by diffusion through the crystalline interfaces 23.

Figure 3:
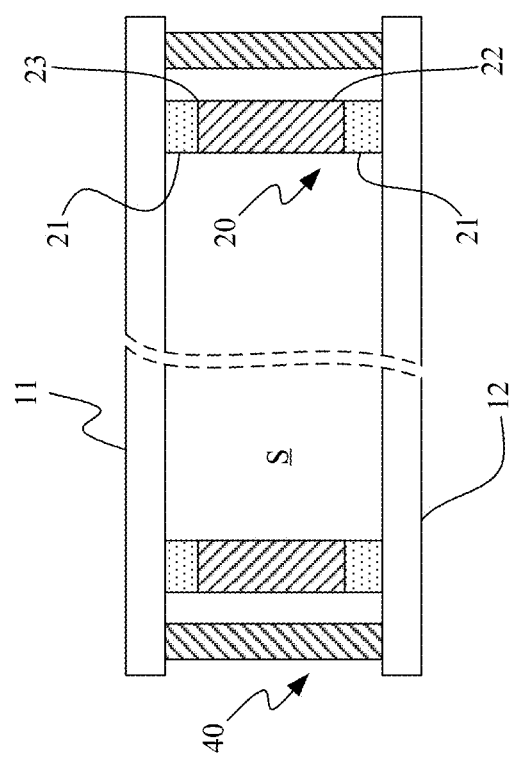
FIG. 3 illustrates the package structure with an auxiliary sealing frame according to the present invention.

Moreover, if the silicone is not totally cured during polymerization, it is easy to perform reaction with the moisture and produce unwanted byproducts, such as water or hydrogen. To solve this problem, please refer to FIG. 3, an auxiliary sealing frame 40 is disposed between the substrates 11 and on the outside of the sealing frame 20. The auxiliary sealing frame 40 is made of material selected from the group consisting of epoxy, acrylic resin, UV glue, Polyethylene (PE), ethylene vinyl acetate (EVA), Polypropylene (PP), or a combination thereof, to isolate the outside moisture.

Figure 4:
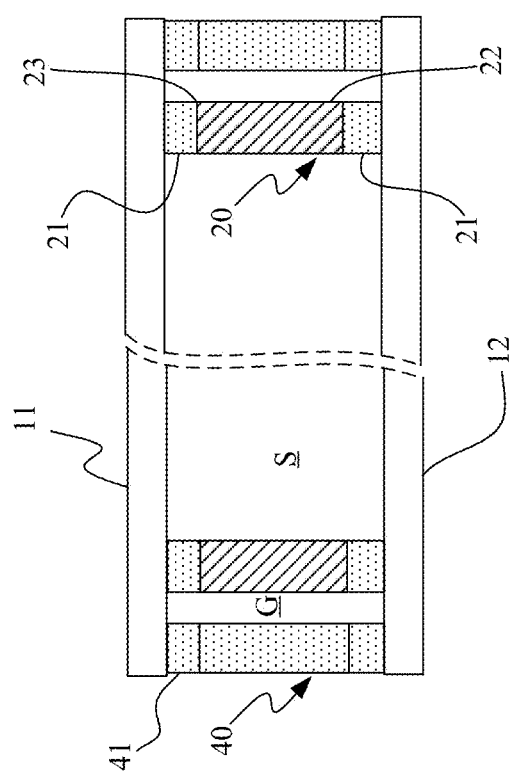
FIG. 4 illustrates another embodiment of the auxiliary sealing frame of the package structure according to the present invention.

Furthermore, for the requirement of the moisture barrier is higher, the auxiliary sealing frame 40 includes three silicone layers which having the same material of the first silicone frames 21, please see FIG. 4. As the above mentions, the moisture only can permeate into the structure by slow diffusion along the interfaces. When the vapor is saturated within the gap G between the auxiliary sealing frame 40 and the sealing frame 20, the moisture can start to permeate the inside space S. Therefore, the moisture barrier is very much improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A package structure, comprising:
   two substrates; and
   a sandwich type sealing frame configured between the substrates and sealing the substrates along their inner circumferences to form a space, the sealing frame comprising:
   two first silicone frames adhering to the substrates along their inner circumferences, wherein the first silicone frames contain a chemical formula I with a first percentage and a chemical formula II with a second percentage; and
   a second silicone frame coupled between the first silicone frames, wherein the second silicone frame contains the chemical formula I with a third percentage and the chemical formula II with a fourth percentage;
   wherein the chemical formula I is:

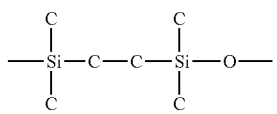

chemical formula II is:

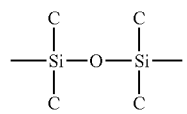

wherein the first percentage is greater than the third percentage, and the second percentage is less than the fourth percentage.

2. The package structure of claim 1, wherein the first silicone frames are at least partially cured to adhere to the substrates and the second silicone frame is cured to adhere to the first silicone frames.

3. The package structure of claim 2, wherein the chemical formula II is substantially aligned along —Si—O—Si— chain after curing.

4. The package structure of claim 1, wherein two crystalline interfaces are formed between the first silicone frames and the second silicone frame.

5. The package structure of claim 1, wherein the first silicone frames are modified by increasing a proportion of addition-type silicone.

6. The package structure of claim 1, wherein the first silicone frames are modified by adding Epoxy, Acrylic Acid or a combination thereof.

7. The package structure of claim 1, wherein the second silicone frame is softer than the first silicone frames.

8. The package structure of claim 1, wherein amounts of the chemical formula II within the second silicone frame is greater than amounts of the chemical formula II within each of the first silicone frames by 0.1% to 60%, on a weight or volume basis.

9. The package structure of claim 1, wherein amounts of the carbon atoms of each of the first silicone frames is greater than amounts of the carbon atoms of the second silicone frame by about 0.01 to 60 mole percent.

10. The package structure of claim 1, wherein amounts of the carbon atoms of each of the first silicone frames is greater than amounts of the carbon atoms of the second silicone frame by about 0.01 to 60 mole percent.

11. The package structure of claim 1, wherein the substrates are selected from a group consisting of polyimide (PI), polyethylene terephthalate (PET), polyethylene naphthalate (PEN), metal, glass, glass fiber and liquid crystal polymer.

12. The package structure of claim 1, wherein further comprises an auxiliary sealing frame, disposed between the substrates and surrounding the first silicone frames and second silicone frame around their outer circumference.

13. The package structure of claim 1, wherein the first silicone frames mainly contain the chemical formula I which is chemically cross-linked with the substrates after curing and generates strong bonding force with the substrates, and the second silicone frame mainly contains the chemical formula II which forms high crystalline structure after curing and has good performances of blocking the moisture.

14. The package structure of claim 12, wherein the auxiliary sealing frame is made of material selected from a group consisting of epoxy, acrylic resin, UV glue, Polyethylene (PE), ethylene vinyl acetate (EVA) and Polypropylene (PP).

15. The package structure of claim 12, wherein the auxiliary sealing frame mainly contains the chemical formula I of:

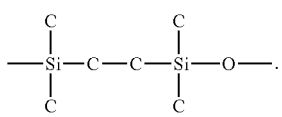

16. The package structure of claim 12, wherein the auxiliary sealing frame is a single-layer structure.

17. The package structure of claim 12, wherein the auxiliary sealing frame surrounds around the first silicone frames and the second silicone frame with contact to the first silicone frames and/or second silicone frame.

18. The package structure of claim 12, wherein the auxiliary sealing frame surrounds around the first silicone frames and the second silicone frame without contact to the first silicone frames and/or second silicone frame.

19. The package structure of claim 1, wherein an intermolecular force of the first silicone frames and an intermolecular force of the second silicone frame are almost equal.

20. The package structure of claim 1, wherein the second silicone frame is made of a heat cured material, and the first silicone frames can bear a curing temperature of the second silicone frame.

* * * * *